United States Patent [19]

Yardley et al.

[11] 4,121,963

[45] Oct. 24, 1978

[54] BONDING POLYAMIDE PLASTICS TO RUBBER COMPOSITIONS

[75] Inventors: James Frank Yardley, Shenston near Lichfield; Allen Frederick Nightingale, Birmingham, both of England

[73] Assignee: Dunlop Limited, London, England

[21] Appl. No.: 521,152

[22] Filed: Nov. 5, 1974

Related U.S. Application Data

[62] Division of Ser. No. 362,211, May 21, 1973, abandoned.

[30] Foreign Application Priority Data

Jun. 15, 1972 [GB] United Kingdom ............... 27939/72
Jan. 20, 1973 [GB] United Kingdom ............... 03056/73

[51] Int. Cl.$^2$ .......................... B29C 27/00; C09J 5/02
[52] U.S. Cl. ................................ 156/308; 156/331; 264/36; 264/22; 264/88; 264/265; 264/328; 264/331; 264/345; 427/54; 427/322; 427/444
[58] Field of Search .................. 264/36, 22, 248, 265, 264/331, 345; 156/110 A, 306, 307, 308, 331; 427/54, 322, 444, 385; 260/857 D; 428/474, 492, 500

[56] References Cited

U.S. PATENT DOCUMENTS

| | | | |
|---|---|---|---|
| 2,875,092 | 2/1959 | Cline ..................................... | 427/54 |
| 2,970,077 | 1/1961 | Groves .................................. | 156/330 |
| 3,022,543 | 2/1962 | Baird et al. ........................... | 264/22 |
| 3,388,029 | 6/1968 | Brignac .............................. | 260/857 D |
| 3,398,044 | 8/1968 | Plueddemann ..................... | 156/272 |
| 3,650,874 | 3/1972 | Job et al. .............................. | 156/306 |

FOREIGN PATENT DOCUMENTS 1,131,506 10/1968 United Kingdom.

OTHER PUBLICATIONS

Floyd, Reinhold Plastics Application Series, "Polyamide Resins", Reinhold, N.Y. (1958) pp. 2-9, 13, 57-60 relied on.
Modern Plastics Encyclopedia (1965) pp. 191 & 195 relied on.
Anon, Webster's Third New International Dictionary, Merriam, Springfield, Mass. (1963), p. 1106 relied on.
Weast, Handbook of Chemistry and Physics, Chem. Rubber Co., Cleveland, (1972), p. B-137 relied on.
Skeist, Handbook of Adhesives, Reinhold, London (1962) pp. 9-11, 447, 448, & 449 relied on, also 255, 256, 257 & 264-266.

*Primary Examiner*—W. E. Hoag
*Attorney, Agent, or Firm*—Stevens, Davis, Miller & Mosher

[57] ABSTRACT

A method of bonding a polyamide plastics material to a rubber composition comprises heating the polyamide plastics material to soften at least its surface, contacting the softened surface with a rubber composition and allowing the polyamide plastics material to cool in contact with the rubber composition. The plastic-rubber composite produced by this method may be used in applications in which hitherto rubber-metal composites have been used, of which the following is a specification.

3 Claims, No Drawings

BONDING POLYAMIDE PLASTICS TO RUBBER COMPOSITIONS

This is a division of application Ser. No. 362,211 filed May 21, 1973, now abandoned.

This invention relates to composite structures and in particular to composite structures comprising polyamide plastics materials and rubber compositions.

According to the invention a composite structure comprises at least one component made of a polyamide plastics material fusion bonded to at least one component made of a rubber composition.

According to a further aspect of the present invention a method of bonding a polyamide plastics material to a rubber composition comprises heating the polyamide plastics material to soften at least its surface, contacting the softened surface with the rubber composition and allowing the polyamide platics material to cool in contact with the rubber composition.

In one embodiment of the invention the rubber composition is vulcanized in contact with the softened polyamide plastics material. The plastics material is heated to a temperature above that at which the rubber is cured, and more preferably to a temperature in excess of the plastics melting point. However, the rubber composition may be prevulcanized or partially prevulcanized, when it is preferred to soften the plastics material by heating it to its melting point or above.

Prior to contacting the softened plastic surface with the rubber composition the surface of the rubber may be pretreated in order to enhance adhesion.

Suitable pretreatments include subjecting the surface to chemical treatment using, for example, acidified sodium hypochlorite, concentrated nitric acid, aqueous solution of trichloroisocyanuric acid (Fi-clor 91), or sodium dichloroisocyanurate (Fi-clor 60S). The above pretreatment reagents may be applied to the rubber surface by any conventional means, for example by dipping, spraying or brushing. The treatment time should be sufficient to enable the rubber surface to be modified without undesirably degrading the bulk of the rubber and the residue of the reagent should be removed after treatment, if it would undesirably affect the polyamide.

Alternatively, the rubber surface may be pretreated by subjecting it to UV radiation.

It is preferred to carry out the above pretreatments on vulcanized rubbers with a high degree of unsaturation. These rubbers should contain in excess of 5 unsaturated bonds for every 100 main chain carbon atoms, and more preferably in excess of 15 unsaturated bonds for every 100 main chain carbon atoms.

Any known method of bringing the polyamide plastics material into contact with the rubber composition may be used. Such methods include compression, injection, transfer or rotational moulding, powder spraying, and fluid-bed methods.

The polyamide plastics materials used are preferably those containing from three to twelve methylene groups between the amido groups (e.g. nylon 4 to 13). These plastics materials may contain any additives (e.g. fillers etc) or processing agents that are normally used with such materials.

Rubbers that may be used in the present invention include polar rubbers such as polyepichlorohydrin rubber, polyepichlorohydrin/ethylene oxide rubber, acrylate rubber, sulpho-chlorinated polyethylene rubber and carboxylated nitrile rubber; or non-polar unsaturated rubbers such as natural rubber, polyisoprene, styrene-butadiene copolymers, acrylonitrile-butadiene copolymers and polychloroprene; the latter group of rubbers preferably being pretreated prior to bonding. These rubbers may contain additives (e.g. fillers etc) or processing agents normally used with such rubber compositions. Blends of these rubbers with each other, or with other rubbers may also be used.

The invention is now illustrated by the following Examples:

EXAMPLE I

A rubber composition containing 100 parts polyepichlorohydrin rubber, 40 parts HAF carbon black, 1.5 parts ethylene thiourea, 1 part nickel dibutyl dithiocarbamate, 1 part zinc stearate and 5 parts red lead, was compounded and calendered into sheets 2.5 mm thick. These sheets were then cured for 60 minutes at 150° C. (all parts are parts by weight). The polyepichlorohydrin rubber used was Herclor H, commercially available from Hercules Incorporated.

Samples of this cured polyepichlorohydrin rubber sheet were placed in a mould with sheets of the polyamide plastics materials listed in Table I below. Pressure was applied to the assemblage which was heated to the moulding temperature listed in Table I for two minutes. The assemblages were allowed to cool under pressure and were then removed from the mould.

The adhesion of the bond so formed was measured using an "Instron" tester in which unbonded portions of the rubber and plastic layers of the bonded assembly were clamped in the jaws of the tester and the jaws were separated at a rate of 20 inches per minute. The value of adhesion found for each plastics material are listed in Table I:

TABLE I

| Plastic | Moulding Temp (° C.) | Adhesion (N/cm) |
|---|---|---|
| Nylon 6* | 240 | 20 |
| Nylon 6/6* | 280 | rubber failure |
| Nylon 6/10* | 280 | rubber failure |
| Nylon 11* | 200 | 22.5 |

*Nylon 6 was commercially available as MARANYL F114, from ICI Ltd.
*Nylon 6/6 was commercially available as MARANYL A100, from ICI Ltd.
*Nylon 6/10 was commercially available as MARANYL B100, from ICI Ltd.
*Nylon 11 was commercially available as RILSAN BMNO, from Aquitane-Fisons Ltd.

EXAMPLE II

Example I was repeated using a rubber composition containing 100 parts epichlorohydrin/ethylene oxide copolymer, 40 parts HAF carbon black, 1.5 parts ethylene thiourea. 1 part nickel dibutyl dithiocarbamate, 1.5 parts zinc stearate and 5 parts red lead (all parts are parts by weight), which was cured at 150° C. for 60 minutes. The epichlorohydrin/ethylene oxide copolymer used contained 38 weight per cent ethylene oxide and is commercially available as Herclor C, from Hercules Incorporated.

The moulding temperature used and strength of bond obtained for each plastic material is given in Table 2:

TABLE 2

| Plastic | Moulding Temp (° C.) | Adhesion (N/cm) |
|---|---|---|
| Nylon 6 (MARANYL F114) | 240 | 12.5 |
| Nylon 6/6 (MARANYL A100) | 280 | rubber failure |
| Nylon 6/10 (MARANYL B100) | 280 | rubber failure |
| Nylon 11 | | |

TABLE 2-continued

| Plastic | Moulding Temp (° C.) | Adhesion (N/cm) |
|---|---|---|
| (RILSAN BMNO) | 200 | 20 |

EXAMPLE III

Example I was repeated using a rubber composition comprising 100 parts acrylic ester copolymer rubber, 50 parts HAF carbon black, 1 part stearic acid, 5 parts dibasic lead phosphite (Diphos), 1 part hexamethylene-diamine carbamate and 1.5 parts polymerized trimethyl dihydroquinoline (all parts are parts by weight), which was cured for 60 minutes at 150° C. The acrylic ester copolymer rubber used was commercially available as Hycar 4021, from B. F. Goodrich Chemical Company.

The moulding temperature used and bond strength obtained for each plastic material is recorded in Table 3:

TABLE 3

| Plastic | Moulding Temp (° C.) | Adhesion (N/cm) |
|---|---|---|
| Nylon 6 (MARANYL F114) | 240 | 15 |
| Nylon 6/6 (MARANYL A100) | 280 | rubber failure |
| Nylon 6/10 (MARANYL B100) | 280 | rubber failure |
| Nylon 11 (RILSAN BMNO) | 200 | some adhesion |

EXAMPLE IV

A rubber composition containing 100 parts of sulphur-curable polyurethane (Adiprene CM), 50 parts HAF carbon black, 15 parts coumarone indene resin, 4 parts dibenzthiazole disulphide, 1 part mercaptobenzthiazole, 0.7 part sulphur, 0.35 part zinc chloride/dibenzthiazole disulphide complex and 0.5 part cadmium stearate (all parts are parts by weight), was compounded and calendered into sheets 2.5 mm thick. These sheets were then cured for 60 minutes at 140° C.

A sheet of the above rubber composition was placed in a mould with a sheet of Nylon 11 (commercially available as RILSAN BMNO from Aquitane-Fisons Ltd). Pressure was applied to the assemblage which was heated for two minutes at 200° C. The assemblage was allowed to cool under pressure and was then removed from the mould.

The bond strength was measured by the process described in Example I, and was found to be 50 N/cm.

EXAMPLE V

Example IV was repeated using rubber composition containing 100 parts carboxylated nitrile rubber (Revinex 211A), 40 parts SRF carbon black, 5 parts dibutyl phthalate, 5 parts zinc oxide, 1 part stearic acid, 1.5. parts sulphur and 1 part dibenzthiazole disulphide (all parts being parts by weight), which was cured for 60 minutes at 150° C. The above rubber composition and a sample of Nylon 11 were moulded for two minutes at 200° C. and allowed to cool under pressure. The strength of bond formed between the plastic and rubber was 60 N/cm.

EXAMPLE VI

The rubber composition of the formulation given below was vulcanized for 40 minutes at 150° C. in a mould measuring 4.0 mm × 76.2 mm × 228.6 mm.

| | Parts by Wt |
|---|---|
| styrene-butadiene rubber (Intol 1500) | 100 |
| N330 carbon black | 50 |
| mineral oil | 5.0 |
| zinc oxide | 3.0 |
| sulphur | 1.75 |
| stearic acid | 1.0 |
| N-cyclohexyl benzthiazole-2-sulphenamide | 1.0 |
| 4-isopropylamino-diphenylamine (Nonox ZA) | 0.15 |
| reaction product of diphenylamine and acetone (BLE 25) | 1.25 |

A slab measuring 4.0 mm × 76.2 mm × 101.6 mm was cut from sheets and dipped for 5 minutes in an acid hypochlorite solution consisting of:

| | |
|---|---|
| water (ml) | 1000 |
| conc. hydrochloric acid (ml) | 5 |
| sodium hypochlorite solution containing 12 per cent wt/vol of available chlorine (ml) | 30 |

The sheet was allowed to dry and then heated to 170° C. before being placed in a mould measuring 9.5 mm × 76.2 mm × 101.6 mm. Nylon 6/6 commercially available from ICI as MARANYL A100, was injected into the mould from an Edgwick 1214 HY (MK III) 4–4½ oz. injection-moulding machine under a pressure of 94 MN/m$^2$ which was maintained for 15 secs. The mould and nozzle of the injector were respectively at 98° C. and 300° C. After cooling for 60 secs. the composite was demoulded. The strength of the bond between the rubber and the plastic was determined by peel adhesion at a jaw separation rate of 500 mm/min. A bond strength of 135 N per cm with failure in the rubber was obtained.

EXMPLE VII

The rubber composition of the formulation given below was vulcanized for 40 minutes at 150° C. in a mould measuring 4.0 mm × 76.2 mm × 228.6 mm.

| | Parts by Wt |
|---|---|
| butadiene-acrylonitrile rubber (Butakon A3003) | 100 |
| N330 carbon black | 50 |
| di-Alphanol phthalate (a phthalate plasticizer based on C$_7$ to C$_9$ alcohols) | 10 |
| stearic acid | 2.0 |
| zinc oxide | 5.0 |
| N-cyclohexyl benzthiazole-2-sulphenamide | 1.0 |
| magnesium carbonate-coated sulphur | 1.5 |
| condensation product of acetone and diphenylamine (Nonox B) | 1.0 |

Samples of this rubber composition, measuring 4.0 mm × 76.2 mm × 101.6 mm were pretreated by dipping in the reagents given in Table 4. The pretreated samples were then bonded to Nylon 6/6 as described in Example VI, and the bond strength for each sample was measured, as described in that Example. The values of bond strength for each sample are given in Table 4:

TABLE 4

| Sample | Pretreatment | Bond Strength (N/cm) |
|---|---|---|
| A | acidified sodium hypochlorite as Example VI | 115 |
| B | concentrated nitric acid | 140 |
| C | 3 per cent wt/vol aqueous solution of sodium dichloroisocyanurate (Fi-clor 60S) | 30 |
| D | none | 0 |

EXAMPLE VIII

The procedure carried out in Example VII sample A was repeated, the rubber being bonded to a sample of Nylon 6/6 containing 25 per cent glass fibre reinforcement. A bond strength of 55 N/cm was obtained under the test conditions described in Example VI.

EXAMPLE IX

Example VI was repeated using a rubber composition of the formulation:

|  | Parts by Wt |
|---|---|
| polychloroprene (Neoprene WRT) | 100 |
| N330 carbon black | 35 |
| stearic acid | 2.0 |
| zinc oxide | 5.0 |
| sulphur | 0.5 |
| tetramethylthiuram disulphide | 0.5 |
| 1,3-diphenyl guanidine | 0.5 |
| reaction product of diphenylamine and di-isobutylene (Octamine) | 1.0 |

A bond strength of 40 N/cm was obtained under the test conditions described in Example VI.

EXAMPLE X

A sample of the vulcanized rubber composition used in Example VII was irradiated for 10 minutes at a distance of 50 mm with a 600 watt UV lamp. A sheet of nylon 6/6 was compression-moulded on to the treated surface by heating at 280° C. until the plastic was molten. The mould was then cooled under pressure. The strength of the bond between the rubber and plastic was determined by peel adhesion at a jaw separation of 500 mm/min. A bond strength of 68.5 N/cm with partial failure of the rubber was obtained.

Having now described our invention - what we claim is:

1. A method of bonding a substantially crystalline thermoplastic polyamide plastics material selected from the group consisting of nylon 4, nylon 5, nylon 6, nylon 6/6, nylon 6/10, nylon 7, nylon 8, nylon 9, nylon 10, nylon 11, nylon 12, and nylon 13 to a prevulcanized rubber composition, which is the vulcanizate of a rubber containing in excess of 5 unsaturated bonds for every 100 main chain carbon atoms, consisting essentially of heating said polyamide plastics material to fuse at least its surface, then contacting the fused surface with said prevulcanized rubber composition, which when based on a non-polar rubber has had its surface pretreated by a chemical reagent selected from the group consisting of acidified sodium hypochlorite, concentrated nitric acid, an aqueous solution of trichloroisocyanuric acid, and sodium dichloroisocyanurate or UV radiation prior to bringing the surface of said prevulcanized rubber composition into contact with the fused polyamide plastics surface, and allowing the polyamide plastics material to cool in contact with said prevulcanized rubber composition.

2. A method according to claim 1 in which the prevulcanized rubber composition is the vulcanizate of a rubbery polymer containing in excess of 15 unsaturated bonds for every 100 main chain carbon atoms.

3. A method according to claim 1 in which the prevulcanized rubber composition is based on a rubbery polymer selected from the group consisting of natural rubber, polyisoprene, styrene-butadiene copolymers, acrylonitrile-butadiene copolymer and polychloroprene.

* * * * *